United States Patent
Bezold et al.

(10) Patent No.: US 10,367,713 B2
(45) Date of Patent: Jul. 30, 2019

(54) CLOUD BASED SYSTEM AND METHOD FOR MANAGING TESTING CONFIGURATIONS FOR CABLE TEST DEVICES

(71) Applicant: Fluke Corporation, Everett, WA (US)

(72) Inventors: David E. Bezold, Mukilteo, WA (US); Steve O' Hara, Poulsbo, WA (US)

(73) Assignee: Fluke Corporation, Everett, WA (US)

( * ) Notice: Subject to any disclaimer, the term of this patent is extended or adjusted under 35 U.S.C. 154(b) by 358 days.

(21) Appl. No.: 14/884,131

(22) Filed: Oct. 15, 2015

(65) Prior Publication Data
US 2017/0111258 A1  Apr. 20, 2017

(51) Int. Cl.
*G06F 15/16* (2006.01)
*H04L 12/26* (2006.01)
*H04L 12/24* (2006.01)

(52) U.S. Cl.
CPC .......... *H04L 43/50* (2013.01); *H04L 41/0813* (2013.01); *H04L 41/0816* (2013.01); *H04L 41/0823* (2013.01); *H04L 41/0853* (2013.01); *H04L 41/0856* (2013.01); *H04L 43/0811* (2013.01)

(58) Field of Classification Search
CPC . H04L 43/50; H04L 41/0813; H04L 41/0816; H04L 41/0823; H04L 41/0853; H04L 41/0856; H04L 43/0811
USPC ................................. 709/224, 219
See application file for complete search history.

(56) References Cited

U.S. PATENT DOCUMENTS

| | | |
|---|---|---|
| 5,311,516 A | 5/1994 | Kuznicki et al. |
| 6,041,355 A | 3/2000 | Toga |
| 6,496,014 B1 | 12/2002 | Cook |
| 6,823,479 B1 | 11/2004 | McElhaney, Jr. et al. |
| 6,847,213 B2 | 1/2005 | Renken et al. |
| 7,024,548 B1 | 4/2006 | O'Toole, Jr. |
| 7,181,017 B1 | 2/2007 | Nagel et al. |
| 7,457,866 B1 | 11/2008 | Hackworth et al. |
| 7,479,776 B2 | 1/2009 | Renken et al. |
| 7,502,850 B2 | 3/2009 | Fellenstein et al. |

(Continued)

FOREIGN PATENT DOCUMENTS

| | | |
|---|---|---|
| EP | 2 627 041 A2 | 8/2013 |
| WO | 2014/145168 A1 | 9/2014 |
| WO | 2014/161003 A1 | 10/2014 |

OTHER PUBLICATIONS

International Search Report for International Application No. PCT/US2016/057206 dated Jan. 24, 2017, 13 pages.

(Continued)

*Primary Examiner* — Oscar A Louie
*Assistant Examiner* — Oluwatosin M Gidado
(74) *Attorney, Agent, or Firm* — Seed IP Law Group LLP

(57) ABSTRACT

A system and method for receiving a data packet in a cable network testing device from a remotely located cloud host service/device. The data packet contains selected cable test device configuration instructions. The selected device instructions, once implemented in a cable test device, configure the cable test device to perform one or more cable network testing procedures in accordance with predetermined testing parameters. The cloud host service/device contains a plurality of test device configuration instructions to be selected by a user, which user may be remote from the cable test device.

13 Claims, 5 Drawing Sheets

(56) References Cited

U.S. PATENT DOCUMENTS

| | | |
|---|---|---|
| 7,623,784 B1 | 11/2009 | Pan et al. |
| 7,720,940 B1 | 5/2010 | Wilsey et al. |
| 7,860,115 B1 | 12/2010 | Scudder et al. |
| 8,174,996 B2 | 5/2012 | Omar |
| 8,355,926 B1 | 1/2013 | Hinz et al. |
| 8,813,228 B2 | 8/2014 | Magee et al. |
| 8,910,294 B1 | 12/2014 | Sennett et al. |
| 8,935,765 B2 | 1/2015 | Morales |
| 9,047,484 B2 | 6/2015 | Briere et al. |
| 9,225,539 B2 | 12/2015 | Aguren |
| 9,397,922 B1 | 7/2016 | Collins |
| 9,400,301 B2 | 7/2016 | Kanne et al. |
| 9,541,472 B2 | 1/2017 | Neeley et al. |
| 9,749,039 B1 | 8/2017 | Chen et al. |
| 2002/0049962 A1 | 4/2002 | Kelbaugh et al. |
| 2002/0144187 A1 | 10/2002 | Morgan et al. |
| 2003/0134599 A1 | 7/2003 | Pangrac et al. |
| 2003/0159001 A1 | 8/2003 | Chalmer et al. |
| 2004/0015744 A1 | 1/2004 | Klotz et al. |
| 2004/0113604 A1 | 6/2004 | Renken et al. |
| 2004/0199342 A1 | 10/2004 | Graves et al. |
| 2005/0140377 A1 | 6/2005 | Komatsu |
| 2006/0005065 A1 | 1/2006 | Nakayama et al. |
| 2006/0048200 A1 | 3/2006 | Jaworski et al. |
| 2006/0064434 A1 | 3/2006 | Gilbert et al. |
| 2006/0085322 A1 | 4/2006 | Crookshanks |
| 2007/0195711 A1 | 8/2007 | Morris et al. |
| 2007/0234410 A1 | 10/2007 | Geller |
| 2008/0072050 A1 | 3/2008 | Klonover et al. |
| 2008/0208806 A1 | 8/2008 | Dalfo et al. |
| 2008/0275714 A1 | 11/2008 | Martinez |
| 2008/0300945 A1 | 12/2008 | Simpson et al. |
| 2010/0150319 A1 | 6/2010 | Irenze et al. |
| 2010/0304686 A1 | 12/2010 | Kennedy et al. |
| 2010/0318929 A1* | 12/2010 | Hilton .................. G06F 3/0486 715/769 |
| 2011/0084132 A1 | 4/2011 | Tofighbakhsh |
| 2011/0103242 A1 | 5/2011 | Hittel et al. |
| 2013/0041613 A1* | 2/2013 | Bhide .................. G06F 11/263 702/123 |
| 2013/0173962 A1 | 7/2013 | Li et al. |
| 2013/0212207 A1 | 8/2013 | Ong |
| 2013/0305091 A1 | 11/2013 | Stan et al. |
| 2013/0318589 A1 | 11/2013 | Ford et al. |
| 2014/0036065 A1 | 2/2014 | Oakley et al. |
| 2014/0047560 A1 | 2/2014 | Meyer et al. |
| 2014/0281484 A1 | 9/2014 | Kurkowski et al. |
| 2014/0281737 A1* | 9/2014 | Compann ............... H04L 41/32 714/46 |
| 2014/0292348 A1 | 10/2014 | Kanne et al. |
| 2014/0337674 A1 | 11/2014 | Ivancic et al. |
| 2015/0106616 A1 | 4/2015 | Nix |
| 2015/0163206 A1 | 6/2015 | McCarthy et al. |
| 2015/0195182 A1 | 7/2015 | Mathur et al. |
| 2015/0253379 A1 | 9/2015 | Lin et al. |
| 2015/0256825 A1 | 9/2015 | Priest |
| 2015/0278076 A1 | 10/2015 | BS et al. |
| 2015/0316600 A1 | 11/2015 | Davis |
| 2015/0350095 A1 | 12/2015 | Raney |
| 2015/0381467 A1 | 12/2015 | Girmonsky et al. |
| 2016/0048112 A1 | 2/2016 | Pandurangan et al. |
| 2016/0072693 A1 | 3/2016 | Michaelis |
| 2016/0091549 A1 | 3/2016 | Snook et al. |
| 2016/0124034 A1 | 5/2016 | Shoor et al. |
| 2016/0301575 A1 | 10/2016 | Jau et al. |
| 2016/0381123 A1 | 12/2016 | Kanne et al. |
| 2017/0093684 A1 | 3/2017 | Jayaraman et al. |
| 2017/0094446 A1 | 3/2017 | Maggiore |
| 2017/0104768 A1 | 4/2017 | Semenko et al. |
| 2017/0141966 A1 | 5/2017 | Hittel et al. |
| 2017/0142076 A1 | 5/2017 | Ford et al. |
| 2017/0257365 A1* | 9/2017 | Gonzalez ............... H04L 63/20 |
| 2017/0257376 A1 | 9/2017 | Dulkin et al. |

OTHER PUBLICATIONS

Extended European Search Report, dated Feb. 21, 2017, for European Application No. 16204813.6—1958, 6 pages.
Extended European Search Report, dated Mar. 29, 2017, for European Application No. 16204801.1—1870, 10 pages.
International Search Report and Written Opinion, dated Jan. 16, 2017, for International Application No. PCT/US2016/056102, 12 pages.
"Turn on Cached Exchange Mode," Microsoft Support Center, 2007, URL=https://support.office.com/en-us/article/Turn-on-Cached-Exchange-Mode-7885af08-9a60-4ec3-850a-e221cled0c1c#Id0EAABAAA=2007_, 4 pages.

* cited by examiner

CLOUD BASED SYSTEM AND METHOD FOR MANAGING TESTING CONFIGURATIONS FOR CABLE TEST DEVICES

FIELD OF THE INVENTION

The disclosed embodiments generally relates to network cabling testing, and more particularly, to remotely configuring cable test devices.

BACKGROUND OF THE INVENTION

Modern networking systems can be networked through an interconnection of cables to provide increased communication, memory capacity and operating flexibility. Building, managing, and re-configuring the cable connections of a networked computer system is a complex task that may involve cable wiring diagrams, labeled cables, and connector reference designators. The task becomes increasingly complex with an increasing number of cables, connections and possible configurations, to the point where it is extremely difficult to effectively manage the cables, connections and configurations of the networked system in the traditional manner.

In this regards, cable testing devices and systems are utilized by technicians to test various cables types (e.g., copper and fiber optic cables) that facilitate data communications in buildings. For instance, every cable should be tested when installed and/or modified to verify that it is working properly. Each test is typically conducted from one termination point (usually in a wall jack) to a second termination point (often in a patch panel in a data/computer closet). An important aspect of each test is the cable testing/verification/certification configuration implemented in a cable testing device.

Modern test equipment is now beginning to be "cloud connected" (e.g. cable testing devices are capable of transmitting results of its testing, including the fact that a test was made, to a service available through the internet. Until very recently, users of such test equipment and measurement equipment configured the equipment via the User Interface of the equipment itself.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, described is a system and method for receiving a data packet in a cable network testing device from a remotely located cloud host service/system. The data packet contains selected cable test device configuration instructions. The selected device instructions, once implemented in a cable test device, configure the cable test device to perform one or more cable network testing procedures in accordance with predetermined testing parameters. The cloud host service/system contains a plurality of test device configuration instructions to be selected by a user, which user may be remote from the cable test device.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
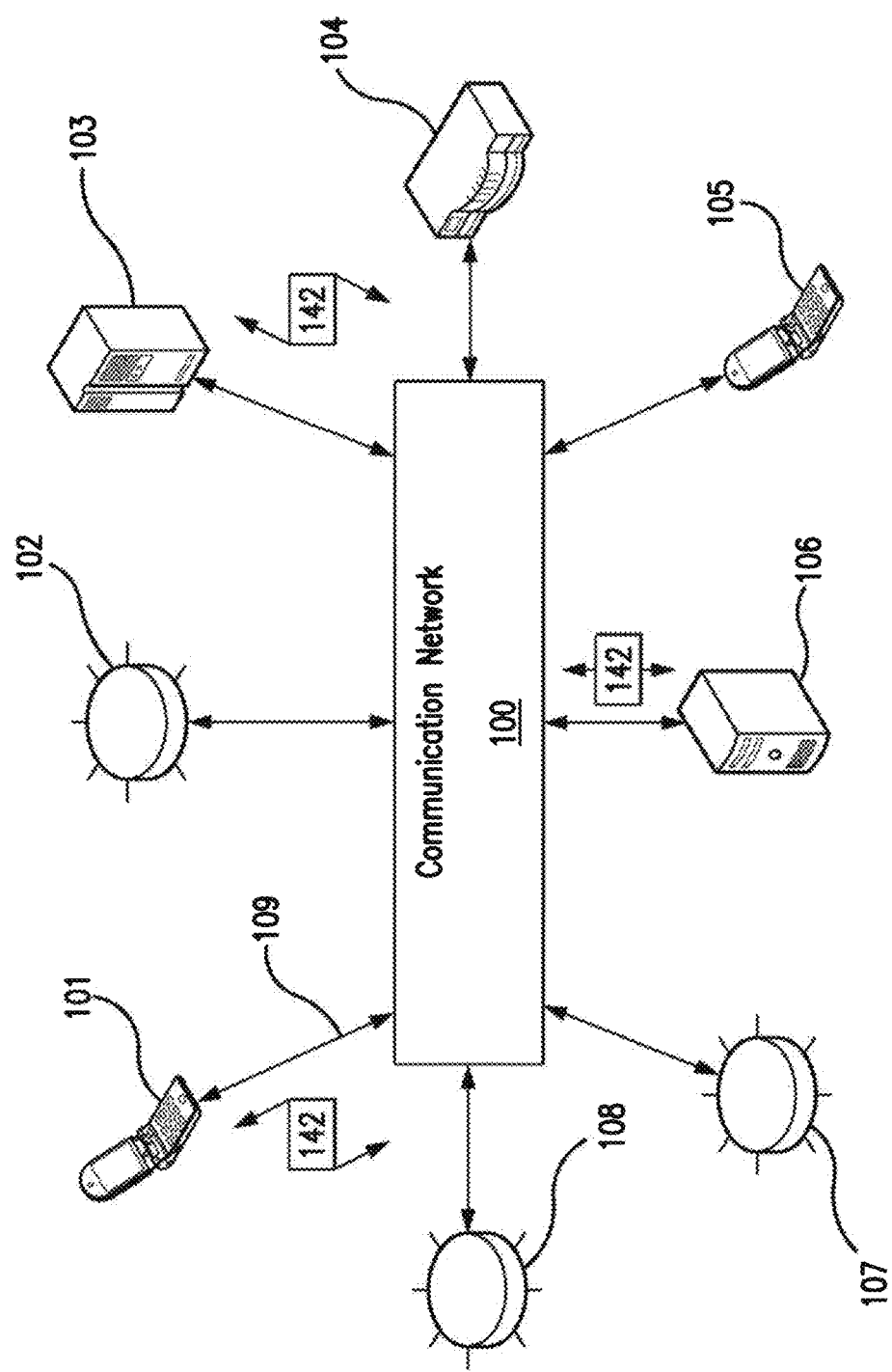
FIG. 1 depicts an exemplary communications network in which below illustrated embodiments may be implemented.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, cable testing device 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
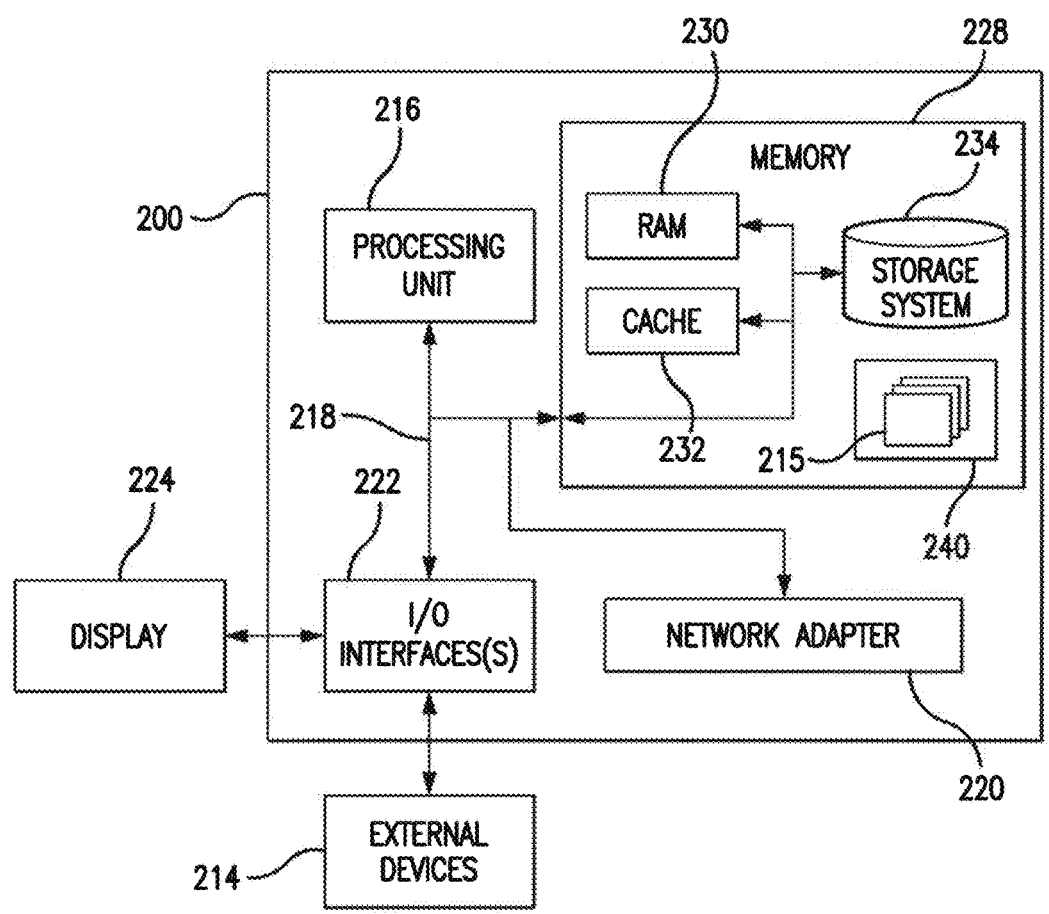
FIG. 2 depicts an example network device/node which may be used with the below illustrated embodiments.

FIG. 2 is a schematic block diagram of an example network computing device 200 (e.g., client computing device 103, server 106, smart phone device 105, cable testing device 107.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3A:
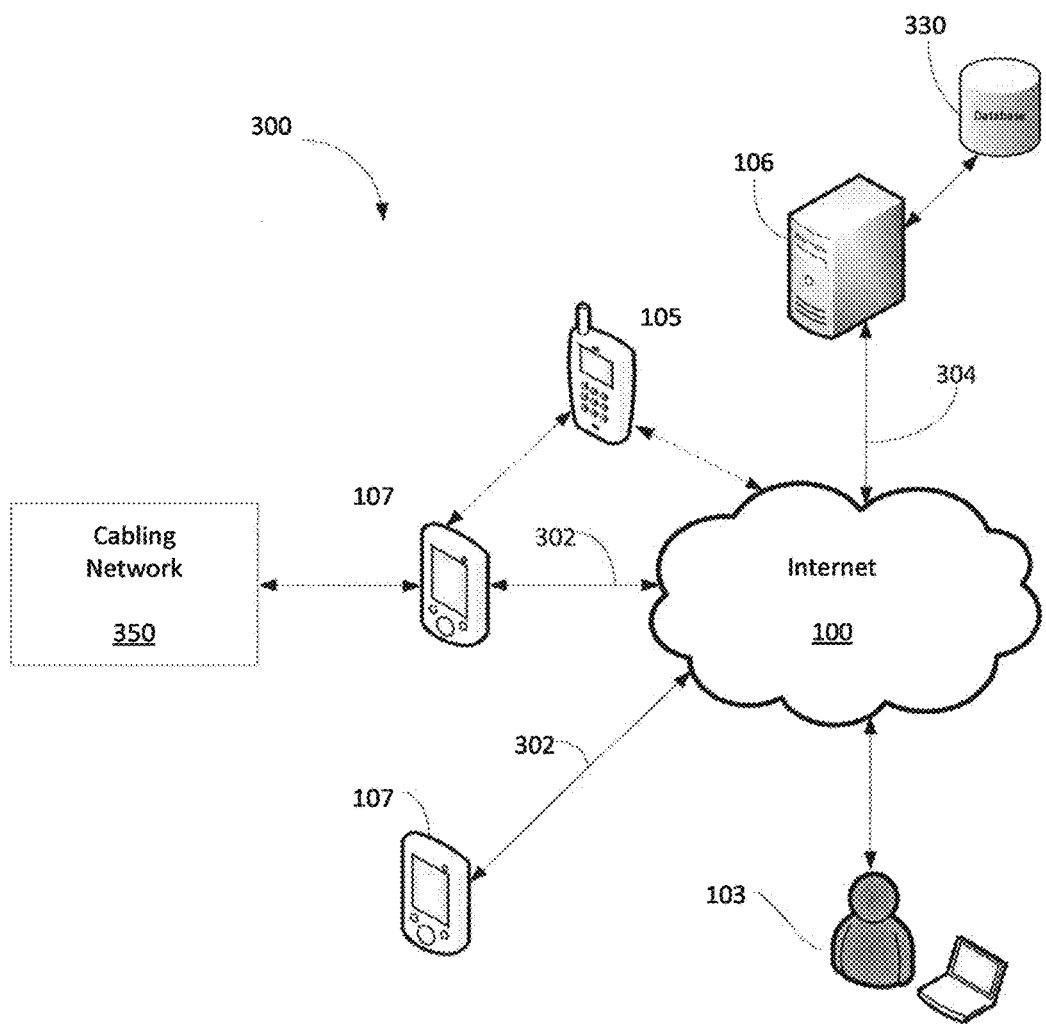
FIGS. 3A and 3B depicts a cabling testing system 300 in accordance with the below illustrated embodiments.
Figure 3B:
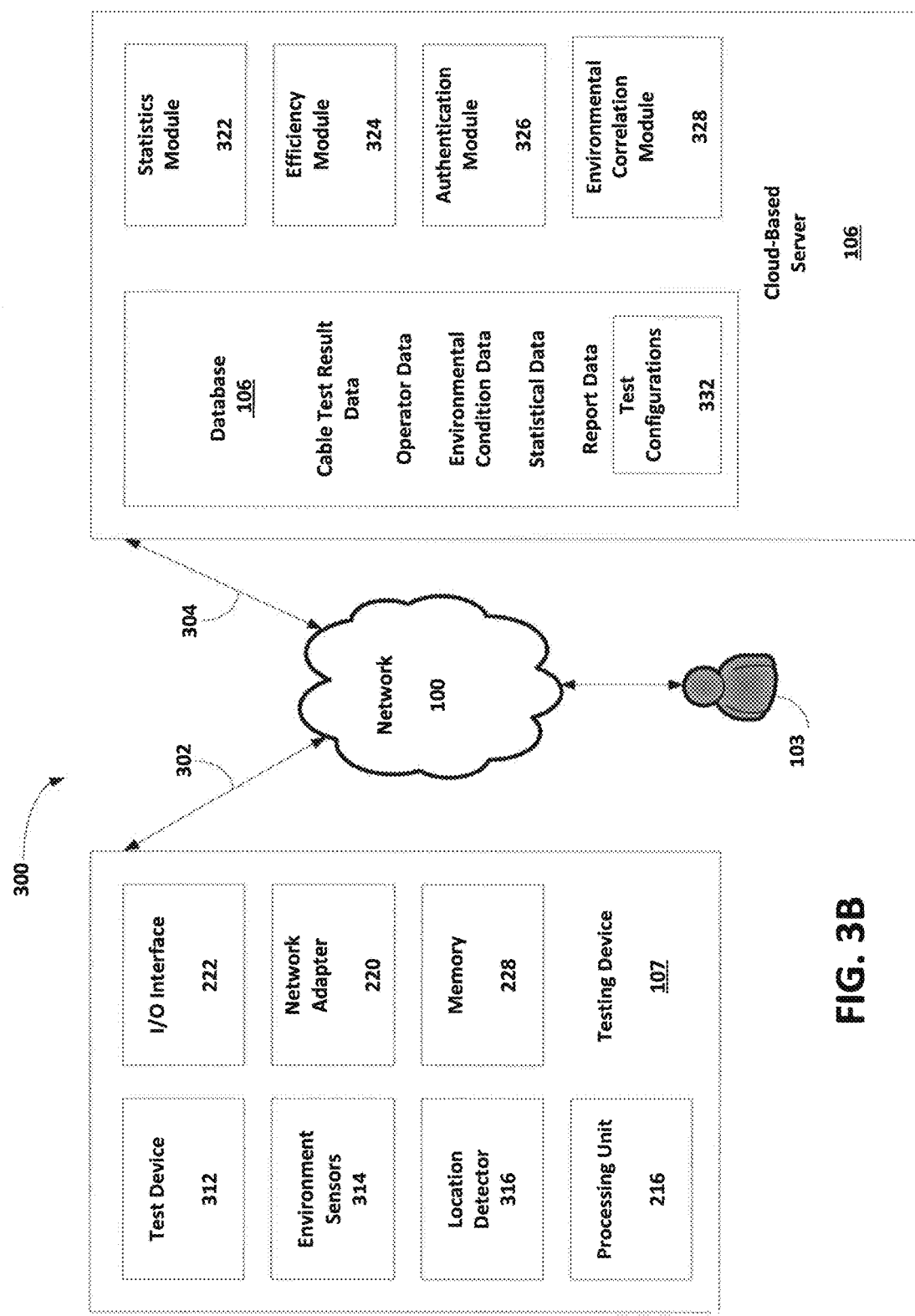

With the exemplary communication network 100 (FIG. 1) and computing device 200 (FIG. 2) being generally shown and discussed above, description of certain illustrated embodiments of the present invention will now be provided. With reference now to FIGS. 3A and 3B, a cloud-based network testing system 300 includes a plurality of cabling testing devices 107 (as described below). It is to be appreciated a cloud-based server/host 106 (as also described below) receives test result data from different testing devices 107 regarding various functions including, but not limited to: generating statistics related to the testing devices 107 and authenticating test result data received from testing devices 107. Further, the cloud-based server 106 can be used to analyze the test result data to determine efficiency in performance of a job or performance by an operator of testing devices 107.

It is to be appreciated that for ease of illustration purposes, only usage of a single testing device 107 is described, however, it is to be understood cabling testing system 300 may involve the simultaneous use of a plurality devices 107. An example testing device 107 is a portable tool than can include a computer system that functions as a node of a network which is similar to communication network 100 shown in FIG. 1. Similarly, the server 106 can be a web server that includes a computer system that functions as a node of network 100.

The testing device 107 preferably communicates with the network 100 using a first communication link 302, and the server 106 communicates with the network 100 using a second communication link 304. The first and second communication links 302, 304 can each include a single or multiple wired and/or wireless links. In embodiments, some of these links use near-field communication, such as radio frequency identification (RFID), cellular telecommunication schemes (e.g., 3G, LTE), Bluetooth, infrared communication, or the like. In embodiments, the network 100 includes the Internet. The testing device 107 can be selectively coupled (using its internal communication components) to the network 100 so that the first communication link 302 can be intermittent, e.g., disrupted and reestablished. The second communication link 304 can be stable and readily available during operation times for communicating with the testing device 107. In other embodiments, the testing devices 107 communicate indirectly with the cloud-based server 105 via a communication device 106, such as a mobile phone, tablet, or laptop computer.

The testing device 107 and the cloud-based server 106 can each be configured similarly to the network computing device 200 shown in FIG. 2, such as to include a processing unit 216, a network adapter 220, an I/O interface 222, and memory 228.

It is to be understood network testing system 300 may encompass a variety of different types of cabling testing devices 107. Examples include, and are not limited to the flowing Fluke Network® instruments: OptiFiber® Pro OTDR; CertiFiber® Pro Optical Loss Test Set and the DSX-5000 CableAnalyzer™. It is to be further appreciated the illustrated embodiments of the present disclosure encompass tests for network cable including diagnostics, verification, qualification, and certification. With regards to certification testing, and as a non-limiting example, the Versiv™ product from Fluke Network® may be used to facilitate such cable certification.

The testing device 107 may allow simultaneous operation of multiple applications. It is to be appreciated the testing device 107 may include an operating system (e.g., Linux) embedded hardware/server. As described further below, using a combination of the features of an operating system, the testing device 107 may be configured to receive firmware updates and test configurations by a network connection preferably via the Internet 100. As also explained further below, the test configurations are preferably software packets sent from a cloud-based server device 106 (via network 100) to a testing device 107 to enable/configure the testing device 107 to perform predetermined testing routines upon a network 350 to be tested by a testing device 107.

In operation, the testing device 107 may conduct a cabling test, e.g., for diagnostics, verification, certification, or qualification of copper or fiber cable. Cables to be tested can include low-voltage CAT3, CAT5, CAT5E, CAT6, UTP, STP, SSTP and/or FTP data cables, standard voltage electrical wiring, and/or connectors (e.g., connecting devices) that connect two or more cables) that form a portion of a network within a premise (e.g., a home, office, school, and the like). In an example test procedure, one or more ports of the testing device's I/O interface 222 are coupled to at least one of a patch panel port of a patch panel in a data closet via patch cables for exchanging test signals and responses to test signals. Test procedures can include, for example, a cable integrity test or a network connectivity test associated with one or more networked devices (e.g., routers, switches, end-devices, etc.).

As shown in FIG. 3B, the testing device 107 is typically a portable device that can further include a test device 312, environmental sensors 314, and/or a location detector 316. The test device 312 includes one or more sensors to measure electrical characteristics of a signal or power source. The environmental sensors 314 include one or more sensors to measure a characteristic of a physical entity, such as temperature, humidity, an exerted force, etc. Environmental sensors 314 can further detect electromagnetic interference (e.g., radio frequency interference), such as to determine proximity to devices that emit electromagnetic energy. The test device 312 and environmental sensors 314 can include an analog-to-digital (A/D) converter to convert the output signals into digital data. The output from the test device 312 and environmental sensors 314 can be time-stamped.

The location detector 316 senses a location of the testing device 107. The location detector 316 can include a Global Positioning System (GPS) sensor. In embodiments, the location detector 316 can include sensors that detect a characteristic, such as an optical code or RFID code, associated with a fixed device having a known location.

Additionally, in embodiments, the location detector 316 can include a device that is external from the testing device 107, and/or included in the cloud-based server 106. In an embodiment, the location detector 316 can be associated with a fixed device having a known location. The location detector 316 associated with the fixed device can sense the presence of the testing device 107, e.g., using optical sensing, RFID, Bluetooth, etc. In another embodiment, the location detector 316 included in the testing device 107 can detect the fixed device and use the location of the fixed device. In either of these scenarios, the location of fixed device can be used to determine the location of the testing device 107. Further, in embodiments, the location detector 316 can include logic to infer location of the testing device 107 from network signals such as IP address, RFID, WIFI, and Bluetooth MAC addresses, and/or a GSM/CDMA cell ID associated with the testing device 107. The location detector 316 outputs time-stamped location data indicative of a location of the testing device 107. The location data can include geolocation data and/or a position of the testing device 107 inside a building, such as relative to a floor map.

The test device 312, environment sensors 314, and location detector 316 can include hardware and software modules (e.g., program modules 215 stored by memory 228 of the server 106.

The testing device's I/O interface 222 can include one or more cable ports (e.g., an Ethernet port, data cable jacks such as RJ 45 jacks, wire clamps, optical ports, and the like), that interface with a cable, such as a patch cord. Test signals and responses can be transmitted and received via the cable ports.

The testing device's processing unit 216 is configured to select test signals to transmit via the cable ports (e.g., pings) pursuant to test configuration instructions typically stored in the device memory 228. The processing unit 216 can further process signals received in response to transmission of the test signals via the ports. The processing unit 216 can process output received from the test device 312 and the environmental sensors 314, perform one or more circuit and/or network connectivity diagnostic tests, and generates corresponding test result data pursuant to specific test configuration instructions. The test result data can include metadata and data that provides information about the test procedure and the test results.

For example, the test result data can indicate which type of entity was read or measured (e.g., voltage, current, time (e.g., time interval from ping transmit till ping receive), IP address, bit rate, packet capture rate, and the like) and a value that was read or measured. The value that was measured can be an electrical property (e.g., voltage or current) detected on a cable, time, IP addresses, bit rate, packet capture rate, or other measurements that indicate network device performance and/or network connectivity performance, and the like. Under the instructions from specific test configurations, the processing unit 216 can use utilities, such as Network Scans, Network Mapping, DNS resolution, DHCP, PING, TraceRoute, IPerf IPv4, and IPv6, etc., and the like, to generate the test result data.

Examples of information that the test result data and associated metadata can further provide include: information about a time that the testing procedure was begun and finished; identification of one or more operators operating the testing device 107; identification of the testing device 107; identification of a patch cord coupled to the testing device 107; identification of the cable under test; location data indicating a geographic location at the time of the testing procedure; environmental conditions at the time of the testing procedure; identification of the testing procedure being performed and/or a job that the testing procedure belongs to.

A job can be, for example, an installation job, in which a network or a portion of a network is installed at a particular location. In another example, a job can be a diagnostic job to identify and correct a problem. In another example, without limitation to the examples listed, a job can be a maintenance job to determine or measure performance of a network.

Identification of the testing device 107, cable under test, and/or patch cord used can be used to determine additional information, such as the make, model, manufacturer, owner, etc. of the testing device 107. The identification of the testing procedure and associated job can be used to determine additional information, such as for which customer the testing procedure or associated job is being performed as a service; which customer uses the cable under test for data communication, an associated monetary value (cost or billable value) for the testing procedure; and/or a geographic location, time, cable, patch cord, operator, duration, etc. that is assigned in connection with the testing procedure or job.

The testing device 107 can include a display device 224 or provide displayable test result data to a remote device, such as a mobile device (e.g., device 105). External devices 214 coupled to the testing device 107 can include a user input device (e.g., a keyboard, touchscreen (e.g., display device 224), and/or biometric sensor) via which an operator can enter user identification information (user ID). Entry of the user ID can be time stamped, and can be used to authorize use of the testing device 107 by the user. The input device can be used to send user input or requests to the cloud-based server 106. For example, if a user notices an anomaly in operation of a network cable, the user can send an alert to the cloud-based server 106 so that the cloud-based server can investigate if there is a correlation between the anomaly and environmental conditions indicated by output from the environment sensors 314.

During a test procedure pursuant to executing test configurations as received from the cloud-based server 106 (as further described below), the testing device 107 can generate one or more test signals, transmit the test signals for testing a cable, receive response test signals, process the response test signals, and transmit results to the cloud-based server 106 for analysis thereof. Processing the response test signals can include verifying whether or not a cable is receiving and transmitting data as intended (e.g., that the cable is connected properly, that the component wires of the cable have been terminated correctly without being crossed, all wires in the cable are transmitting data, etc.). When data is obtained from a test (pursuant to an executed received test configuration setup received from the cloud-based server 106), it may be stored in the testing device 107 and/or transmitted to the cloud-based server 106. Further, data may be aggregated for comparison with data from other testing devices 107 or cloud-based servers 106.

The cloud-based server 106 receives the test result data from the plurality of testing devices 107. It is to be appreciated the cloud-based server 106 may implement the LinkWare™ Live product from Fluke Network® to store and manage test result data received from remote testing devices 107 as well as to transmit test configurations to a testing device 107 as described further below.

The cloud-based server 106 preferably includes a statistics module 322, an efficiency module 324, an authentication module 326, and an environmental correlation module 328, each of which can include software modules (e.g., program modules 215 stored by memory 228 of the server 304). The cloud-based server 106 includes or is coupled to a database 330 that stores information for a plurality of testing devices 107 that can couple to the cloud-based server 106 via network 100. Information stored by the database 330 can include, for example, cable test result data, operator data, environmental condition data, statistic data, and/or report data.

In accordance with an illustrated embodiment, and as discussed further below with regards to the flow chart of FIG. 4, a plurality of test configuration setups 332 are stored in the database 330 associated with the cloud-based server 106, which test configurations 332 are remotely selectable by either a user of a testing device 107 or a remote user 103 of a testing device 107 so as to be "downloaded" from the cloud-based server 106 to a remotely located testing device 107 for execution by the testing device 107 as described herein. Once downloaded, the user of a testing device 107 selects a configuration such that the testing device applies the downloaded, and selected test configuration. Thus, a user 103 remote from the testing device 107 is enabled to configure the test parameters of measurement equipment 107 without ever being in the presence of that equipment 107. It is to be appreciated, the cloud service 106 can potentially configure many different parameters, including but not limited to: 1) media type, including but not limited to fiber and copper; 2) cable type within the selected media type; 3) test types assigned, including but not limited to Copper, OTDR, Loss/Length, and Fiber Inspection; 4) identification of the ends of a cable to test for tests for which that is an option, such as OTDR; 5) setup parameters the control the measurements for the test type; 6) assignment of cables associated with each test type; 7) labeling schemes associated with each cable; and 8) the types of data kept within a measurement result file.

A remote user 103 via a user computing device (e.g., node smartphone device 105, a client computing device 103, or the testing device 302) may access a cloud-based service provided by the cloud-based server 304 to request and/or receive information output by the cloud-based server 304. In an example embodiment, access to the cloud-based service can be provided by web-browser software resident on the user computing device running applications (e.g., Java applets or other applications), which may include application programming interfaces ("API's") to more sophisticated applications running on remote servers.

In an example embodiment, through web-browser software, a user can use a computer 103 to log on to cloud-based services (e.g., by the web-browser software resident on the computer 103 communicating with cloud-based server device 106) to access cloud-based applications for one or more testing devices 107. After logging-on to a cloud-based application on server 106, the user may create, edit, save and delete aforesaid cable testing configurations in the cloud-based server device 106, and may establish (set up) or change/edit various options, such as user preferences and/or system settings, and/or may receive or download software (e.g., operating system or other software) or software updates, various data files or media files, user preferences and/or system settings, and other information previously stored on the cloud-based server device 106.

In accordance with an illustrated embodiment, the cloud-based application implemented on the cloud-based server device 106 may provide various cable testing configurations facilitating cabling testing by one or more testing devices 107. Accordingly, what is illustrated is a cloud-based computer server 106 for performing cabling diagnostics from test results received from at least one testing device 107 configured to perform cabling testing pursuant to a cabling testing configuration regarding a network 350 to be tested as prescribed by a remote located server 106.

Figure 4:
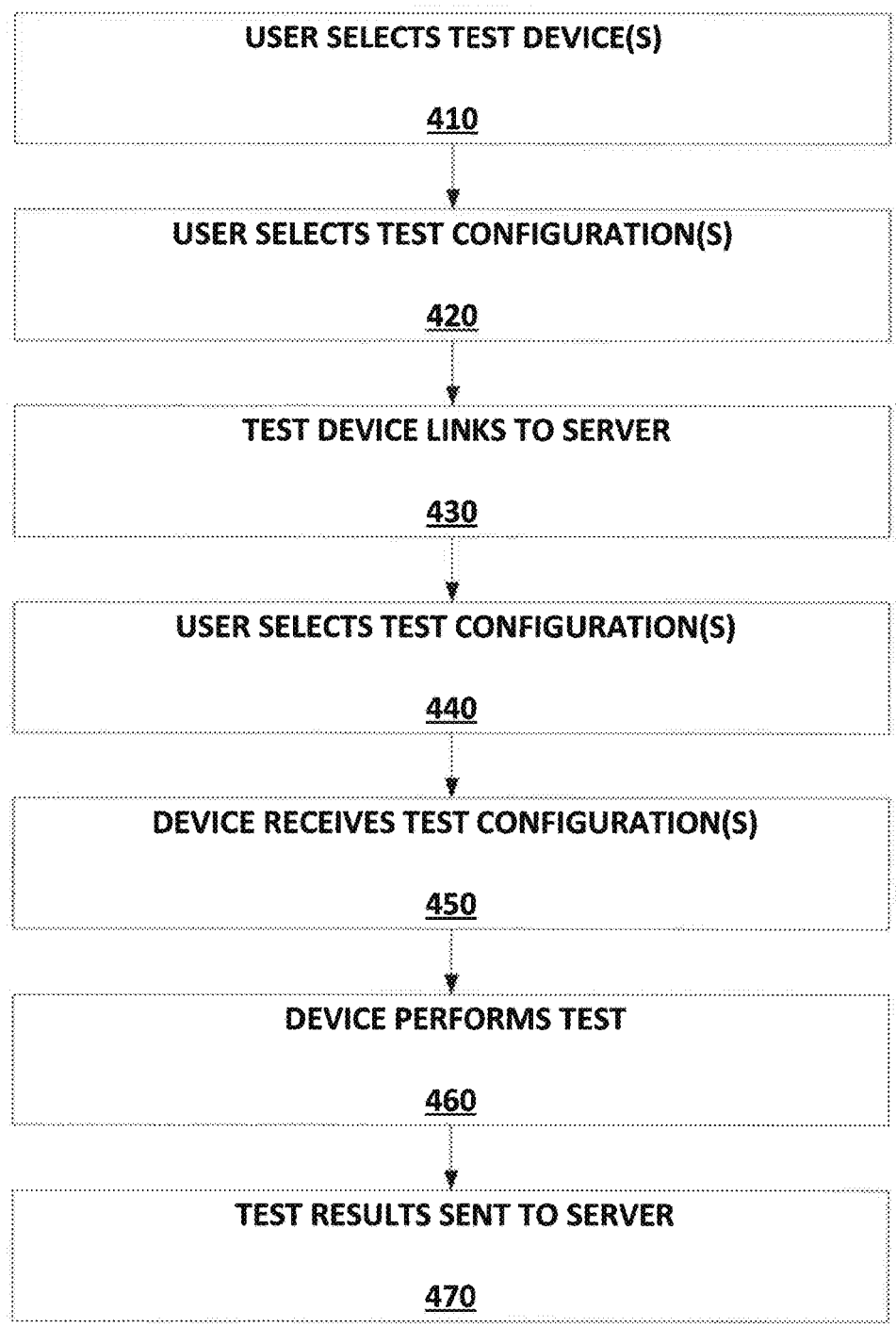
FIG. 4 illustrates a flowchart depicting an illustrated method of operation of the illustrated embodiments.

With reference now to FIG. 4, shown is a flowchart demonstrating implementation of the various exemplary embodiments regarding selecting and transmitting test device configuration instructions from the cloud-based server device 106 to one or more test devices 107 via a network 100. It is noted that the order of operations shown in FIG. 4 is not required, so in principle, the various operations may be performed out of the illustrated order. Also certain operations may be skipped, different operations may be added or substituted, or selected operations or groups of operations may be performed in a separate application following the embodiments described herein.

Staring at operation 410, a user, which may be remote from a test device (e.g., user 103) or which may be a user of the test device 107, preferably logs into a program implemented on the cloud-based server device 106 (as described above) to first select one or more test devices 107 designated to receive test configuration instructions. Next, step 420, the user preferably selects one or more test configuration instructions to be sent to the selected device 107 (step 410). In the event the test device 107 is not already coupled for data communication with the cloud-based server device 106 (as described above), the test device 107 is caused to be coupled to the cloud-based server device 106 for data communication therewith, step 430.

Once the designated test device 107 (step 410) is coupled to the cloud-based server device 106 (step 430), the selected test configuration instructions (step 420) are preferably sent as a data packet from the cloud-based server device 106 to the designated test device 107, step 440. Thereafter, the test device 107 preferably stores the received packet of test configuration instructions in device memory 228 so as to thereafter be selected by the user of the test device 107, step 450. Once selected, the processing unit 216 of the test device 107 causes the test device 107 to perform preferably a cable network test (as described above) in accordance with the prescribed device testing parameters and setup configuration per the selected test configuration instructions, step 460. After the test device 107 performs the prescribed test (step 450), the test device 107 preferably causes the test results to be transmitted to the cloud-based server device 106 (via the network 100 as described above), step 470.

Thus, the above described embodiments enable a user to configure the test parameters of measurement/test equipment 107 without requiring being in the presence of that equipment 107.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:
1. A method comprising:
   storing, at a cloud host device, a plurality of test device configuration instructions that each include parameters for configuring a plurality of cable network testing devices to perform different cable network testing procedures;
   receiving, at the cloud host device and from a first computing device, each of the following:
      a selection of a cable network testing device from the plurality of cable network testing devices, wherein the selected cable network testing device is separate from the first computing device,
      a user-defined test device configuration instruction to add to the plurality of test device configuration instructions, wherein the user-defined test device configuration instruction includes parameters for configuring the selected cable network testing device to perform a cable network testing procedure, and
      a first selection of test device configuration instructions from the plurality of test device configuration instructions to provide to the selected cable network testing device;

receiving, at the selected cable network testing device and from the cloud host device, one or more data packets that contain the first selected test device configuration instructions including the user-defined test device configuration instruction;

receiving, at the selected cable network testing device and from a user of the selected cable network testing device, a second selection of one or more test device configuration instructions from the first selected test device configuration instructions;

configuring the selected cable network testing device to perform one or more cable network testing procedures based on the second selected test device configuration instructions; and performing, by the selected cable network testing device, the one or more cable testing procedures in accordance with the second selected test device configuration instructions.

2. The method as recited in claim 1, wherein the one or more data packets are wirelessly received by the selected cable network testing device.

3. The method as recited in claim 2, wherein the selected cable network testing device couples to the cloud host device via a Wide Area Network (WAN).

4. The method as recited in claim 1, wherein the selected cable test device couples to a separate communication device and wherein the communication device wirelessly couples to the cloud host device via a Wide Area Network (WAN).

5. The method as recited in claim 1, wherein the plurality of test device configuration instructions prescribe at least one of: a cable media type to be tested; a cable type to be tested; and test types assigned.

6. The method as recited in claim 1, wherein the plurality of test device configuration instructions prescribe at least one of: a designated cable end to be tested; setup parameters for controlling testing measurements of a cable; assignment of cables associated with each test type; labeling schemes associated with each cable to be tested; and types of test results data to be captured in the testing device.

7. A system for testing cable networks comprising:
at least one cable test device configured to perform cabling testing pursuant to a cabling testing configuration;
a cloud host device configured to couple to the at least one test device for transmission of data therewith, the cloud host device including:
  a database that store a plurality of cabling testing configurations each capable of configuring a cable test device to perform a cable testing procedure in accordance with predefined instructions; and
  a processor that executes computer instructions to cause actions, the actions including:
    receiving, from a first computing device that is separate from the at least one cable test device, each of:
      a selection of a cable test device from the at least one cable test device,
      a user-defined cabling testing configuration to add to the plurality of cabling testing configurations, wherein the user-defined cabling testing configuration capable of configuring the selected cable network testing device to perform a cable testing procedure, and
      a first user selection of a subset of cabling testing configurations from the plurality of cabling testing configurations in the database; and
    transmitting the first selected cabling testing configurations including the user-defined cabling testing configuration to the selected cable test device; and
wherein the at least one test device includes the selected cable test device, the selected cable test device includes a processor that executes computer instructions to cause actions, the actions including:
  receiving, from the cloud host device, the first selected cabling testing configurations;
  receiving a second user selection of one or more cabling testing configurations from the first selected cabling testing configurations; and
  performing one or more cable testing procedures in accordance with the second selected cabling testing configuration.

8. The system as recited in claim 7, wherein cabling testing includes performing at least one of a cabling certification, qualification, and verification of a cable.

9. The system as recited in claim 7, wherein the cloud host device is wirelessly coupled to the at least one cable test device.

10. The system as recited in claim 9, wherein the cable test device couples to the cloud host device via a Wide Area Network (WAN).

11. The system as recited in claim 7, wherein the selected cable test device couples to a separate communication device and wherein the communication device wirelessly couples to the cloud host device via a Wide Area Network (WAN).

12. The system as recited in claim 7, wherein the plurality of cabling testing configurations prescribe at least one of: a cable media type to be tested; a cable type to be tested; and test types assigned.

13. The system as recited in claim 7, wherein the plurality of cabling testing configurations prescribe at least one of: a designated cable end to be tested; setup parameters for controlling testing measurements of a cable; assignment of cables associated with each test type; labeling schemes associated with each cable to be tested; and types of test results data to be captured in the testing device.

* * * * *